US012749289B2

(12) United States Patent
Kuen et al.

(10) Patent No.: US 12,749,289 B2
(45) Date of Patent: Sep. 29, 2026

(54) GENERATING LABELS FOR SEGMENTS OF A DIGITAL IMAGE USING A MASK-AWARE CLASSIFICATION NEURAL NETWORK

(71) Applicant: Adobe Inc., San Jose, CA (US)

(72) Inventors: Jason Wen Yong Kuen, Santa Clara, CA (US); Cristina Isabel Gonzalez Osorio, Bogota (CO); Jing Shi, Rochester, NY (US); Jiuxiang Gu, College Park, MD (US); Kushal Kafle, Boston, MA (US); Yuqian Zhou, Urbana, IL (US); Zijun Wei, San Jose, CA (US)

(73) Assignee: Adobe Inc., San Jose, CA (US)

( * ) Notice: Subject to any disclaimer, the term of this patent is extended or adjusted under 35 U.S.C. 154(b) by 335 days.

(21) Appl. No.: 18/423,037

(22) Filed: Jan. 25, 2024

(65) Prior Publication Data

US 2025/0245964 A1 Jul. 31, 2025

(51) Int. Cl.
*G06V 10/764* (2022.01)
*G06T 7/10* (2017.01)

(52) U.S. Cl.
CPC .............. *G06V 10/764* (2022.01); *G06T 7/10* (2017.01); *G06T 2207/20084* (2013.01)

(58) Field of Classification Search
CPC .................... G06V 10/764; G06T 7/10; G06T 2207/20084; G06T 2207/20081; G06T 7/11
See application file for complete search history.

(56) References Cited

U.S. PATENT DOCUMENTS

| | | | | |
|---|---|---|---|---|
| 2016/0358337 | A1* | 12/2016 | Dai | G06T 7/11 |
| 2022/0230321 | A1* | 7/2022 | Zhao | G06T 9/008 |
| 2024/0153093 | A1* | 5/2024 | Xu | G06V 20/70 |

OTHER PUBLICATIONS

Alexander Kirillov, Eric Mintun, Nikhila Ravi, Hanzi Mao, Chloe Rolland, Laura Gustafson, Tete Xiao, Spencer Whitehead, Alexander C. Berg, Wan-Yen Lo, Piotr Dollar, Ross Girshick. "Segment Anything." IEEE Conference On Computer Vision And Pattern Recognition (CVPR) 2023. arXiv:2304.02643. 30 Pages. Apr. 5, 2023.

(Continued)

*Primary Examiner* — Wassim Mahrouka
(74) *Attorney, Agent, or Firm* — Keller Preece PLLC

(57) ABSTRACT

The present disclosure relates to systems, methods, and non-transitory computer readable media that generate segment labels for image segments of a digital image that have been determined via deep segmentation. For instance, in some embodiments, the disclosed systems generate, using a segment classification neural network, an image embedding for a digital image portraying a plurality of image segments. Additionally, the disclosed systems determine, using the segment classification neural network, masked segment embeddings for the plurality of image segments of the digital image based on the image embedding and a plurality of masks corresponding to the plurality of image segments. Based on the masked segment embeddings, the disclosed systems use the segment classification neural network to determine segment labels for the plurality of image segments.

20 Claims, 10 Drawing Sheets

(56) References Cited

OTHER PUBLICATIONS

Feng Liang, Bichen Wu, Xiaoliang Dai, Kunpeng Li, Yinan Zhao, Hang Zhang, Peizhao Zhang, Peter Vajda, Diana Marculescu. "Open-Vocabulary Semantic Segmentation with Mask-adapted CLIP." Proceedings of the IEEE/CVF Conference on Computer Vision and Pattern Recognition. pp. 7061-7070. Oct. 9, 2022.

Lu Qi, Jason Kuen, Yi Wang, Jiuxiang Gu, Hengshuang Zhao, Zhe Lin, Philip Torr, Jiaya Jia. "Open-World Entity Segmentation." IEEE Conference On Computer Vision And Pattern Recognition (CVPR) 2021. arXiv:2107.14228. 14 Pages. Jul. 2021.

Zhuang Liu, Hanzi Mao, Chao-Yuan Wu, Christoph Feichtenhofer, Trevor Darrell, Saining Xie. "A ConvNet for the 2020s." CVPR 2022. arXiv:2201.03545. 15 Pages. Jan. 10, 2022.

* cited by examiner

GENERATING LABELS FOR SEGMENTS OF A DIGITAL IMAGE USING A MASK-AWARE CLASSIFICATION NEURAL NETWORK

BACKGROUND

Recent years have seen significant advancement in hardware and software platforms for digital image processing. Indeed, as the use of digital images has become increasingly ubiquitous, systems have developed to analyze, identify, extract, and/or utilize various features within such digital images. For instance, some conventional systems implement a generalizable image segmentation model to perform dense segmentation on a digital image, partitioning the digital image into its separate image segments even where the nature of those image segments vary greatly. Despite these advancements, conventional digital image processing systems fail to provide accurate classifications for image segments that have been partitioned via dense segmentation.

SUMMARY

One or more embodiments described herein provide benefits and/or solve one or more of the foregoing or other problems in the art with systems, methods, and non-transitory computer-readable media that use a mask-aware classification neural network to accurately generate classifications for image segments of a digital image determined via dense segmentation. In particular, in one or more embodiments, the disclosed systems use a classification neural network to label masks predicted by class-agnostic masking models. To illustrate, in some cases, the disclosed systems provide a digital image and corresponding masks generated by a class-agnostic masking model to the classification neural network. The disclosed systems use the classification neural network to generate a label for each mask (e.g., for the image segment corresponding to them mask). In some cases, the disclosed systems generate the labels using closed-set and/or open-vocabulary categories. In this manner, the disclosed systems generate labels that accurately classify a wide range of image segments determined via generalized, class-agnostic segmentation.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
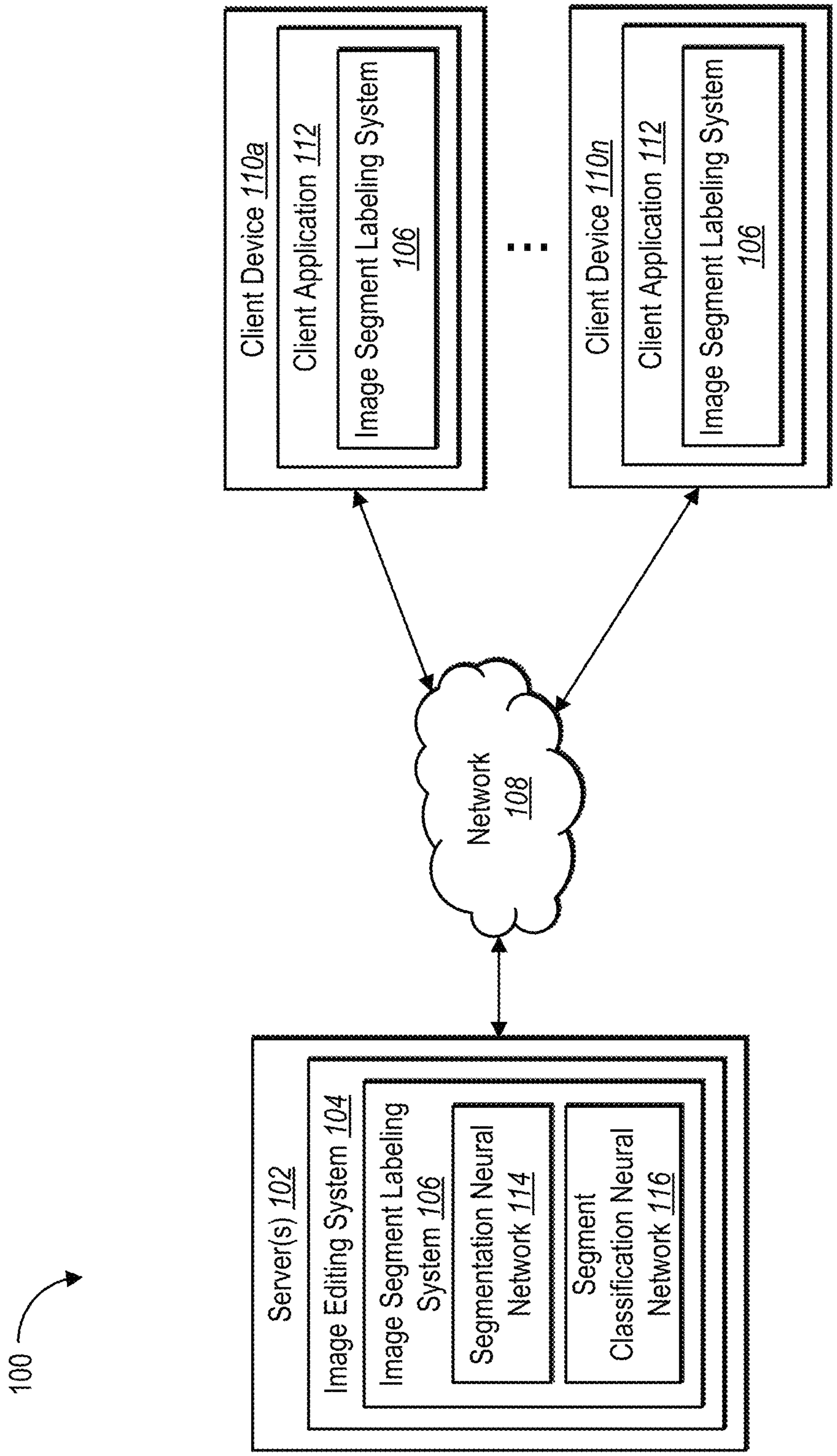
FIG. 1 illustrates an example environment in which an image segment labeling system operates in accordance with one or more embodiments.

One or more embodiments described herein include an image segment labeling system that implements a neural network to generate classification labels for segments of a digital image partitioned via dense segmentation. In particular, in one or more embodiments, the image segment labeling system uses a classification neural network to generate a label for an image segment of a digital image based on an analysis of the digital image and a pre-computed mask for the image segment. For instance, in some cases, the image segment labeling system uses the classification neural network to apply the pre-computed mask to an image embedding of the digital image and generate a label for the image segment based on the resulting representation. In some instances, the image segment labeling system uses a classification neural network that includes parameters determined based on both weak-alignment and strong-alignment data. Further, in some embodiments, the image segment labeling system uses a variety of image segment indicators (e.g., pre-computed masks, bounding boxes, and/or point locations) in determining the parameters.

To illustrate, in one or more embodiments, the image segment labeling system generates, using a segment classification neural network, an image embedding for a digital image portraying a plurality of image segments. The image segment labeling system further determines, using the segment classification neural network, masked segment embeddings for the plurality of image segments of the digital image based on the image embedding and a plurality of masks corresponding to the plurality of image segments. Based on the masked segment embeddings, the image segment labeling system uses the segment classification neural network to determine segment labels for the plurality of image segments.

As just indicated, in one or more embodiments, the image segment labeling system generates segment labels for image segments of a digital image. In particular, the image segment labeling system generates the segment labels for image segments that have been previously determined via dense segmentation. For instance, in some cases, the image segment labeling system generates the segment labels based on masks that have previously been generated for the image segments via the dense segmentation.

To illustrate, in some embodiments, the image segment labeling system uses a segmentation neural network to analyze the digital image, determine distinct image segments portrayed therein, and generate corresponding masks. For instance, in some implementations, the image segment labeling system uses the segmentation neural network to generate masks for objects portrayed within the digital image as well as portions of the background and/or the foreground of the digital image. Indeed, in some cases, the segmentation neural network includes a class-agnostic segmentation neural network that generates masks for distinct image segments regardless of their classification.

In one or more embodiments, the image segment labeling system uses a segment classification neural network to generate segment labels based on the generated masks and the digital image. In particular, in some instances, the image segment labeling system uses an image encoder of the segment classification neural network to generate an image embedding of the digital image. The image segment labeling system further uses the segment classification neural network to generate the segment labels for the image segments of the digital image based on applying the masks to the image embedding. Thus, the image segment labeling system uses the segment classification neural network to incorporate the context surrounding an image segment within the digital image when generating a segment label for the image segment.

In some embodiments, the image segment labeling system determines parameters for the segment classification neural network using both weak-alignment data and strong-alignment data. For instance, in some cases, the image segment labeling system uses strong-alignment data to determine parameters that facilitate generating segment labels from a closed-vocabulary label set and uses weak-alignment data to determine parameters that facilitate generating segment labels from an open-vocabulary label set. In some implementations, the image segment labeling system uses, as part of its training data, pre-generated masks, bounding boxes, and/or point locations corresponding to image segments.

As mentioned above, conventional digital image processing systems suffer from several technological shortcomings that result in inaccurate operation. For instance, conventional systems are inaccurate in that they often fail to accurately label the image segments of a digital image. To illustrate, some conventional systems generate labels for image segments by applying masks of the image segments to the digital image itself. Such a direct application of a mask to the digital image, however, blocks out the pixels of the digital image that are positioned outside the corresponding image segment. Thus, these conventional systems fail to incorporate the context surrounding the image segment when generating its segment label.

Conventional digital image processing systems also typically fail to train their labeling models in a manner that facilitates accuracy at inference time. For instance, many conventional systems limit the data used to learn model parameters that facilitate accurate labeling. To illustrate, some conventional systems limit their training data to weak-alignment data, ignoring other types of data that could be useful in properly aligning image segments with corresponding segment labels. Some conventional systems further incorporate masks along with their corresponding digital images within their training data but omit other types of training inputs that could be useful. Additionally, some conventional systems may use a model that performs both segmentation and segment labeling. Accordingly, these systems typically train their model on both tasks, which can lead to poor segment labeling when the segmentation itself is inaccurate.

Further, conventional digital image processing systems often fail to facilitate accurate downstream processes. Indeed, many conventional systems rely on determined segment labels when executing certain downstream processes, such as processes for recommending models that can use the labeled image segments to produce desired results or suggesting that a user editing the digital image take certain actions that are suitable for the labeled image segments. As many conventional systems tend to inaccurately label image segments, these systems compound their problems when executing their downstream processes.

The image segment labeling system provides several advantages over conventional systems. For example, the image segment labeling system improves the accuracy of implementing computing devices when compared to conventional systems. In particular, the image segment labeling system more accurately labels image segments of a digital image when compared to conventional systems. For instance, by applying a mask determined for an image segment to an image embedding of the corresponding digital image rather than the digital image itself, the image segment labeling system incorporates features of pixels positioned outside the image segment when generating its segment label. Thus, the image segment labeling system generates a more accurate segment label for the image segment by considering the context surrounding the image segment within the digital image.

Additionally, the image segment labeling system trains the model used to generate segment labels in a manner that facilitates more accurate labeling. Indeed, by training the segment classification neural network using training data that includes both strong-alignment data and weak-alignment data as well as a variety of training inputs-such as masks, bounding boxes, and point locations—the image segment labeling system determines model parameters that lead to more accurate labeling results at inference time. Further, by using high-quality, pre-generated masks as part of its training data, the image segment labeling system focuses on learning parameters that improve labeling and avoids potential problems caused by poor segmentation.

Further, the image segment labeling system facilitates more accurate downstream processes when compared to conventional systems. For instance, by generating more accurate segment labels, the image segment labeling system enables implementing systems to more accurately recommend downstream models or more accurately suggest user actions that are appropriate for the labeled image segments.

Additional details regarding the image segment labeling system will now be provided with reference to the figures. For example, FIG. 1 illustrates a schematic diagram of an exemplary system environment ("environment") 100 in which an image segment labeling system 106 operates. As illustrated in FIG. 1, the environment 100 includes a server(s) 102, a network 108, and client devices 110*a*-110*n*.

Although the environment 100 of FIG. 1 is depicted as having a particular number of components, the environment 100 is capable of having any number of additional or alternative components (e.g., any number of servers, client devices, or other components in communication with the image segment classification system via the network 108). Similarly, although FIG. 1 illustrates a particular arrangement of the server(s) 102, the network 108, and the client devices 110*a*-110*n*, various additional arrangements are possible.

The server(s) 102, the network 108, and the client devices 110*a*-110*n* are communicatively coupled with each other either directly or indirectly (e.g., through the network 108 discussed in greater detail below in relation to FIG. 8). Moreover, the server(s) 102 and the client devices 110*a*-110*n* include one of a variety of computing devices (including one or more computing devices as discussed in greater detail with relation to FIG. 8).

As mentioned above, the environment 100 includes the server(s) 102. In one or more embodiments, the server(s) 102 generates, stores, receives, and/or transmits data including digital images and/or segment labels for image segments of the digital images. In one or more embodiments, the server(s) 102 comprises a data server. In some implementations, the server(s) 102 comprises a communication server or a web-hosting server.

In one or more embodiments, the image editing system 104 provides functionality by which a client device (e.g., a user of one of the client devices 110*a*-110*n*) generates, edits, manages, and/or stores digital images. For example, in some instances, a client device sends a digital image to the image editing system 104 hosted on the server(s) 102 via the network 108. The image editing system 104 then provides many options that the client device may use to edit the digital image, store the digital image, and subsequently search for, access, and view the digital image. For instance, in some cases, the image editing system 104 provides one or more options that the client device may use to edit a digital image based on segment labels generated for image segments of the digital image.

Additionally, the server(s) 102 includes the image segment labeling system 106. In one or more embodiments, via the server(s) 102, the image segment labeling system 106 generates segment labels for image segments of a digital image. For instance, in some cases, the image segment labeling system 106, via the server(s) 102, uses a segmentation neural network 114 to identify and generate masks for the image segments. Via the server(s) 102, the image segment labeling system 106 further uses a segment classification neural network 116 to generate segment labels for the image segments based on the digital image and the masks. Example components of the image segment labeling system 106 will be described below with regard to FIG. 6.

In one or more embodiments, the client devices 110*a*-110*n* include computing devices that can access, edit, implement, modify, store, and/or provide, for display, digital images. For example, the client devices 110*a*-110*n* include smartphones, tablets, desktop computers, laptop computers, head-mounted-display devices, or other electronic devices. The client devices 110*a*-110*n* include one or more applications (e.g., the client application 112) that can access, edit, implement, modify, store, and/or provide, for display, digital images. For example, in some embodiments, the client application 112 includes a software application installed on the client devices 110*a*-110*n*. In other cases, however, the client application 112 includes a web browser or other application that accesses a software application hosted on the server(s) 102.

The image segment labeling system 106 can be implemented in whole, or in part, by the individual elements of the environment 100. Indeed, as shown in FIG. 1 the image segment labeling system 106 can be implemented with regard to the server(s) 102 and/or at the client devices 110*a*-110*n*. In particular embodiments, the image segment labeling system 106 on the client devices 110*a*-110*n* comprises a web application, a native application installed on the client devices 110*a*-110*n* (e.g., a mobile application, a desktop application, a plug-in application, etc.), or a cloud-based application where part of the functionality is performed by the server(s) 102.

In additional or alternative embodiments, the image segment labeling system 106 on the client devices 110*a*-110*n* represents and/or provides the same or similar functionality as described herein in connection with the image segment labeling system 106 on the server(s) 102. In some implementations, the image segment labeling system 106 on the server(s) 102 supports the image segment labeling system 106 on the client devices 110*a*-110*n*.

For example, in some embodiments, the image segment labeling system 106 on the server(s) 102 trains one or more machine learning models described herein (e.g., the segmentation neural network 114 and/or the segment classification neural network 116). The image segment labeling system 106 on the server(s) 102 provides the one or more trained machine learning models to the image segment labeling system 106 on the client devices 110*a*-110*n* for implementation. Accordingly, although not illustrated, in one or more embodiments the client devices 110*a*-110*n* utilize the one or more trained machine learning models to generate masks and/or segment labels for image segments of a digital image.

In some embodiments, the image segment labeling system 106 includes a web hosting application that allows the client devices 110*a*-110*n* to interact with content and services hosted on the server(s) 102. To illustrate, in one or more implementations, the client devices 110*a*-110*n* accesses a web page or computing application supported by the server(s) 102. The client devices 110*a*-110*n* provide input to the server(s) 102, such as a digital image. In response, the image segment labeling system 106 on the server(s) 102 utilizes the provided input to generate segment labels for image segments of the digital image. The server(s) 102 then provides the segment labels or recommendations generated based on the segment labels to the client devices 110*a*-110*n*.

In some embodiments, though not illustrated in FIG. 1, the environment 100 has a different arrangement of components and/or has a different number or set of components altogether. For example, in certain embodiments, the client devices 110*a*-110*n* communicate directly with the server(s) 102 bypassing the network 108. As another example, the environment 100 includes a third-party server comprising a content server and/or a data collection server.

Figure 2:
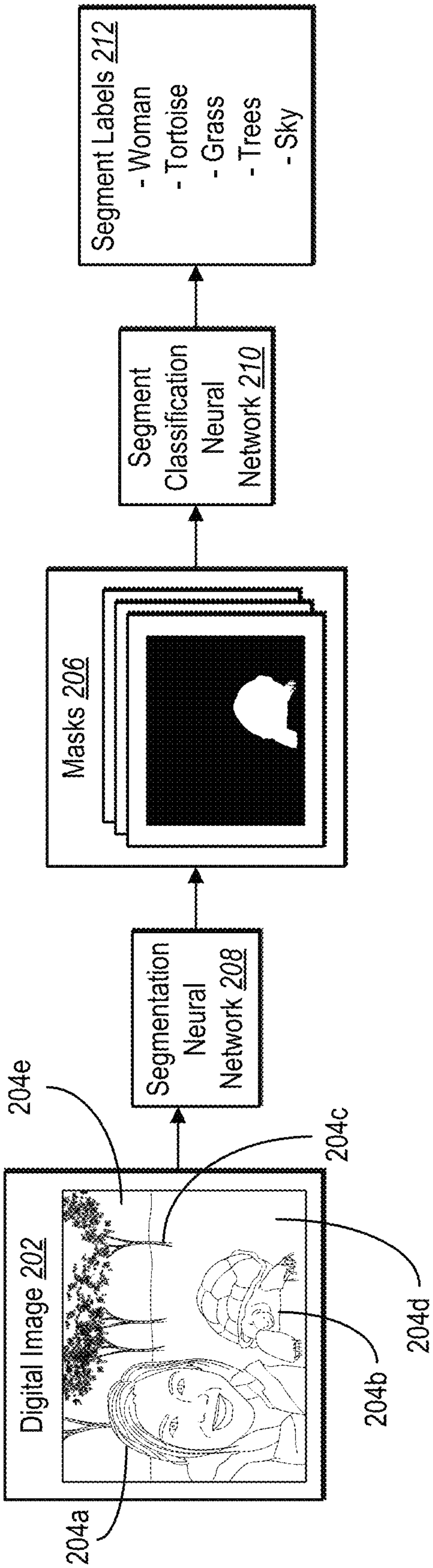
FIG. 2 illustrates an overview diagram of the image segment labeling system generating segment labels for image segments of a digital image in accordance with one or more embodiments.

As mentioned, in one or more embodiments, the image segment labeling system 106 generates segment labels for image segments of a digital image. FIG. 2 illustrates an overview diagram of the image segment labeling system 106 generating segment labels for image segments of a digital image in accordance with one or more embodiments.

In one or more embodiments, an image segment includes a distinct portion of a digital image. In particular, in some embodiments, an image segment includes a portion of a digital image that is distinguishable from one or more other portions of the digital image. For instance, in some cases, an image segment includes an object, foreground, or background of a digital image. In some instances, an image segment includes a portion of an object, foreground, or background that is distinguishable from other portions of the object, foreground, or background, respectively.

In one or more embodiments, a segment label includes a label that classifies an image segment of a digital image. In particular, in some embodiments, a segment label includes a label that indicates a category or type for the image segment. The degree of specificity of a segment label varies in various embodiments. For instance, in some cases, a segment label indicates one or more characteristics of a corresponding image segment (e.g., indicates a color, species, material, or gender represented by the image segment or indicates if the image segment represents something that is natural or man-made) within a class of image segments that distinguishes the image segment from other image segments within the class.

As shown in FIG. 2, the image segment labeling system 106 receives a digital image 202 that portrays several image segments 204_a_-204_e_. Some of the image segments (e.g., the image segments 204_a_-204_c_) represent objects portrayed in the digital image 202, while other image segments (e.g., the image segments 204_d_-204_e_) represent the foreground or background of the digital image 202. While FIG. 2 shows the image segment 204_c_ representing all the trees portrayed in the digital image 202, the image segment labeling system 106 determines that each tree is a separate image segment in some embodiments.

As further shown in FIG. 2, the image segment labeling system 106 analyzes the digital image 202 to generate masks 206 for the image segments 204_a_-204_e_. In particular, the image segment labeling system 106 uses a segmentation neural network 208 to analyze the digital image 202 and generate the masks 206.

In one or more embodiments, a mask includes an identification of pixels in a digital image that represent a particular image segment of the digital image. In particular, in some embodiments, a mask includes an image filter useful for partitioning a digital image into separate portions. For example, in some cases, a mask includes a filter that corresponds to an image segment of a digital image and identifies pixels of the digital image belonging to that image segment as opposed to pixels belonging to the one or more other image segments of the digital image. For example, in some implementations, a mask corresponding to an image segment includes a map of the digital image that has an indication for each pixel of whether the pixel is part of the image segment or not. In such implementations, the indication can comprise a binary indication (a 1 for pixels belonging to the image segment and a zero for pixels not belonging to the image segment). In alternative implementations, the indication can comprise a probability (e.g., a number between 1 and 0) that indicates the likelihood that a pixel belongs to the image segment. In such implementations, the closer the value is to 1, the more likely the pixel belongs to the image segment and vice versa.

In one or more embodiments, a neural network includes a type of machine learning model, which can be tuned (e.g., trained) based on inputs to approximate unknown functions used for generating the corresponding outputs. In particular, in some embodiments, a neural network includes a model of interconnected artificial neurons (e.g., organized in layers) that communicate and learn to approximate complex functions and generate outputs based on inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, a multi-layer perceptron, or a diffusion neural network. In some embodiments, a neural network includes a combination of neural networks or neural network components.

In one or more embodiments, a segmentation neural network includes a computer-implemented neural network that partitions a digital image into multiple image segments. In particular, in some embodiments, a computer-implemented neural network includes a neural network that analyzes a digital image and determines one or more image segments portrayed therein based on the analysis. In some implementations a segmentation neural network further generates a mask for each of the determined image segments.

In some instances, a segmentation neural network includes a class-agnostic segmentation neural network. In one or more embodiments, a class-agnostic segmentation neural network includes a segmentation neural network that determines image segments within a digital image (and generates corresponding masks) regardless of their classification. Indeed, while some segmentation neural networks are implemented to identify a particular category of image segments (e.g., objects in general or a particular set of objects, such as humans), a class-agnostic segmentation neural network identifies and generates masks for image segments regardless of class in some implementations. Thus, in certain embodiments, the image segment labeling system 106 uses a class-agnostic segmentation neural network to perform dense segmentation by identifying each distinct image segment portrayed within a digital image regardless of class and generating object masks for the identified image segments.

As mentioned, and as shown in FIG. 2, the image segment labeling system 106 uses the segmentation neural network 208 to generate the masks 206 for the digital image 202. In particular, the image segment labeling system 106 uses the segmentation neural network 208 to generate a mask for each image segment portrayed within the digital image 202. In one or more embodiments, the image segment labeling system 106 uses, as the segmentation neural network 208, the Entity Segmentation model described by Lu Qi et al., _Open World Entity Segmentation,_ 2022, arXiv: 2107.14228 or the Segment Anything model described by Alexander Kirillov, _Segment Anything,_ 2023, arXiv: 2304.02643, both of which are incorporated herein by reference in their entirety.

As further shown in FIG. 2, the image segment labeling system 106 provides the digital image 202 and the masks 206 to a segment classification neural network 210. In one or more embodiments, a segment classification neural network includes a computer-implemented neural network that generates segment labels for image segments of a digital image. In particular, in some embodiments, a segment classification neural network includes a neural network that generates a segment label for each image segment identified within a digital image. To illustrate, and as will be discussed further below, a segment classification neural network generates segment labels for image segments based on the digital image and masks generated for the image segments in some implementations.

As illustrated, the image segment labeling system 106 uses the segment classification neural network 210 to analyze the digital image 202 and the masks 206. Based on the analysis, the image segment labeling system 106 uses the segment classification neural network 210 to generate segment labels 212 for the digital image 202. In particular, the image segment labeling system 106 uses the segment classification neural network 210 to generate a segment label for each of the image segments 204_a_-204_e_. For instance, in some implementations, the image segment labeling system 106 uses the segment classification neural network 210 to generate a segment label for an image segment based on the digital image and the mask corresponding to the image segment.

Figure 3:
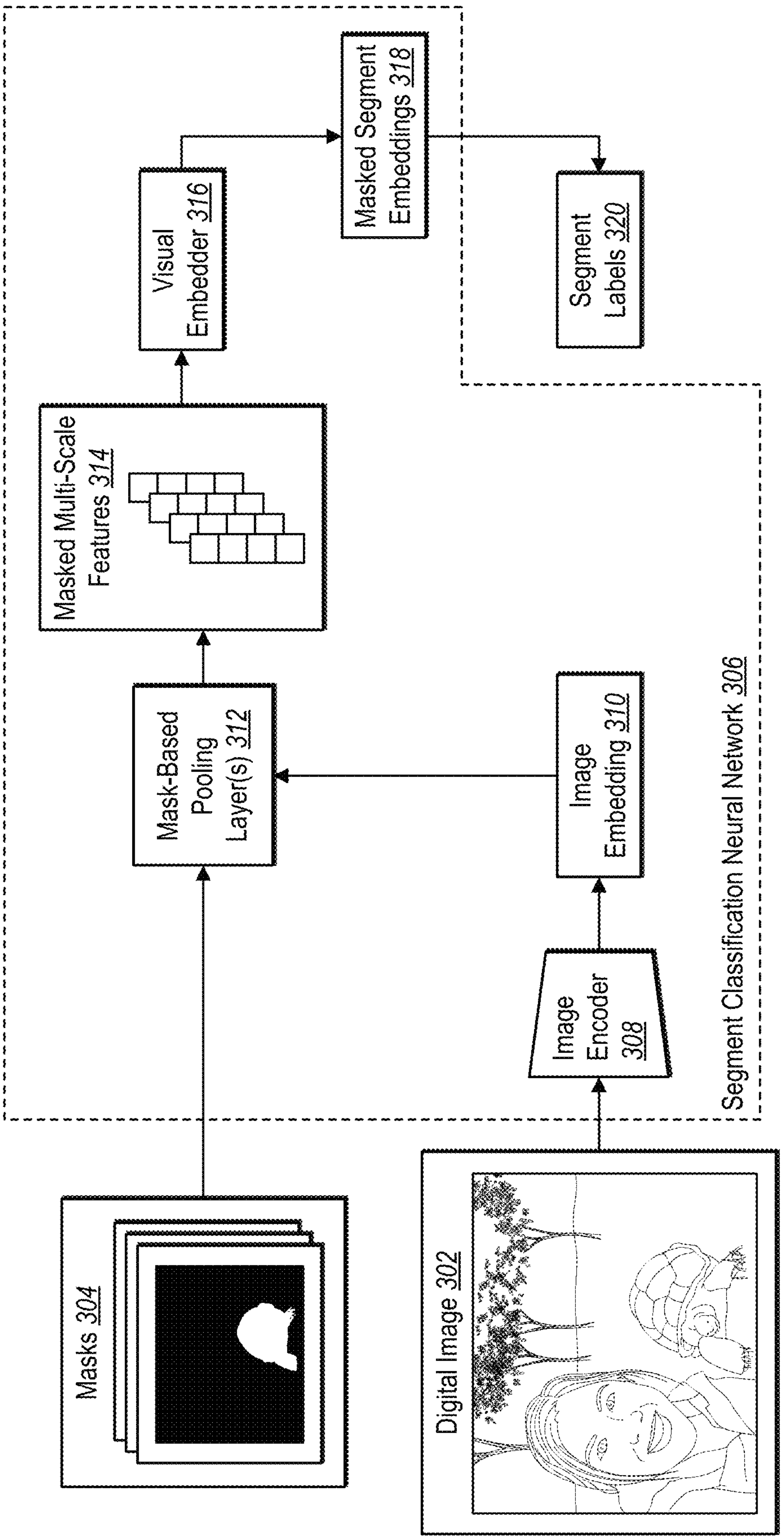
FIG. 3 illustrates the image segment labeling system using a segment classification neural network to generate segment labels in accordance with one or more embodiments.

As mentioned, in one or more embodiments, the image segment labeling system 106 uses a segment classification neural network to generate segment labels for image segments of a digital image. FIG. 3 illustrates the image segment labeling system 106 using a segment classification neural network to generate segment labels in accordance with one or more embodiments.

As shown in FIG. 3, the image segment labeling system 106 provides a digital image 302 and masks 304 corresponding to the digital image 302 (e.g., the image segments portrayed in the digital image 302) to a segment classification neural network 306. As illustrated, the image segment labeling system 106 uses an image encoder 308 of the segment classification neural network 306 to generate an image embedding 310 from the digital image 302.

In some embodiments, the image segment labeling system 106 uses a Contrastive Language-Image Pre-training (CLIP) model or CLIP-based model as the image encoder 308 of the segment classification neural network 306. In some cases, the image segment labeling system 106 uses, as the image encoder 308, the ConvNext model—a convolutional model—described by Zhuang Liu et al., *A ConvNet for the* 2020*s,* 2022, arXiv: 2201.03545, which is incorporated herein by reference in its entirety.

In one or more embodiments, the image embedding 310 represents the digital image 302 in its entirety. For instance, in some cases, the image embedding 310 represents patent and/or latent features of all image segments portrayed within the digital image 302. In some implementations, the image embedding 310 represents multi-scale features. In one or more embodiments, multi-scale features include features of a digital image at multiple scales. In particular, in some embodiments, multi-scale features include patent and/or latent features of a digital image at multiple scales (e.g., various levels of abstraction). Indeed, in some cases, the image segment labeling system 106 uses the image encoder 308 to analyze the digital image 302 at multiple levels of abstraction and extract features determined at several of the levels.

As further shown in FIG. 3, the image segment labeling system 106 provides the image embedding 310 and the masks 304 for the digital image to one or more mask-based pooling layers 312 of the segment classification neural network 306. The image segment labeling system 106 uses the one or more mask-based pooling layers 312 to execute one or more mask-based pooling operations based on the digital image 302 and the masks 304. For instance, in some cases, the image segment labeling system 106 uses the one or more mask-based pooling layers 312 to execute a mask-based pooling operation for each image segment of the digital image 302 based on the image embedding 310 and the corresponding mask for the image segment.

In one or more embodiments, a mask-based pooling operation includes a pooling operation that is executed based at least partially on a mask. Indeed, in some embodiments, a pooling operation includes one or more operations that reduce the dimensionality of a feature map (e.g., a set of features represented within an embedding). Accordingly, in some implementations, a mask-based pooling operation performs the dimensionality reduction using a mask.

As illustrated in FIG. 3, based on the one or more mask-based pooling operations executed via the one or more mask-based pooling layers 312, the image segment labeling system 106 generates masked multi-scale features 314. For instance, in one or more embodiments, the image segment labeling system 106 generates a set of masked multi-scale features for each image segment of the digital image 302. Indeed, in some embodiments, the image segment labeling system 106 generates a set of masked multi-scale features for an image segment of the digital image 302 by executing a mask-based pooling operation via the one or more mask-based pooling layers 312 using the image embedding 310 and a mask corresponding to the image segment.

In one or more embodiments, masked multi-scale features include multi-scale features that have been extracted or generated from other multi-scale features using a mask. In particular, in some embodiments, masked multi-scale features include multi-scale features that have been extracted or generated via a mask-based pooling operation using a mask. To illustrate, in some cases, masked multi-scale features include multi-scale features that have been extracted or generated from the multi-scale features of an image embedding via a mask-based pooling operation using a mask. Thus, in some implementations, a set of masked multi-scale features for an image segment includes multi-scale features extracted or generated from the multi-scale features of an image embedding via a mask-based pooling operation using a mask for the image segment.

Indeed, in one or more embodiments, the image segment labeling system 106 generates, for an image segment of the digital image 302, a set of masked multi-scale features by applying the mask for the image segment to the image embedding 310 via a mask-based pooling operation. Thus, the image segment labeling system 106 uses the mask for an image segment to incorporate features associated with the image segment within the corresponding set of masked multi-scale features and to prevent incorporating features that are unassociated with the image segment.

In one or more embodiments, the image segment labeling system 106 determines that a feature is associated with an image segment if the feature is extracted or generated from one or more pixels included in the image segment. In some embodiments, the image segment labeling system 106 also determines that a feature is associated with an image segment if the feature is extracted or generated from one or more pixels proximate to the image segment (e.g., within a threshold number of pixels of the boundary of the image segment). In some instances, the image segment labeling system 106 further determines that a feature is associated with an image segment if the feature impacts determining a segment label for the image segment. Thus, in some implementations, the image segment labeling system 106 determines that a feature is associated with an image segment even where the feature is extracted or generated from one or more pixels located outside the image segment within the digital image.

Accordingly, in one or more embodiments, the image segment labeling system 106 generates, for an image segment of the digital image 302, a set of masked multi-scale features having one or more features that represent a context of the image segment within the digital image 302. In one or more embodiments, a context of an image segment generally includes information (e.g., information represented by features) that provides information regarding the image segment. In particular, in some embodiments, the context of an image segment includes information that provides information regarding the classification of an image segment. In some implementations, the context of an image segment includes information that is associated with (e.g., extracted or derived from) pixels that are located outside the image segment within the corresponding digital image but that provides an indication of the classification of the image segment. Some examples of information included in the context of an image segment includes, but is not limited to, a location, setting, or environment portrayed in the digital image, a lighting portrayed in the digital image, or object portrayed in the digital image (e.g., objects represented by other image segments).

As shown in FIG. 3, the image segment labeling system 106 uses a visual embedder 316 of the segment classification neural network 306 to generate masked segment embeddings 318 from the masked multi-scale features 314. In particular, in some embodiments, the image segment labeling system 106 uses the visual embedder 316 to generate a masked segment embedding for each image segment of the digital image 302 based on the set of multi-scale features determined for the image segment.

In one or more embodiments, a masked segment embedding includes an embedding for an image segment of a digital image. In particular, in some embodiments, a masked segment embedding includes an embedding generated for an image segment of a digital image using a mask for the image segment. Thus, in some cases, a masked segment embedding includes features that are associated with the image segment and excludes features that are unassociated with the image segment. As illustrated in FIG. 3, in some cases, a masked segment embedding includes an embedding for an image segment generated from a set of masked multi-scale features that have been determined for the image segment.

In one or more embodiments, the visual embedder 316 includes one or more neural network layers that perform one or more operations on each set of masked multi-scale features. For instance, in some cases, the image segment labeling system 106 uses the visual embedder 316 to merge or combine the features included in a set of masked multi-scale features to generate a corresponding masked segment embedding. To illustrate, in some instances, the image segment labeling system 106 uses the visual embedder 316 to determine a masked segment embedding for an image segment by concatenating, summing, or averaging the features included in the corresponding set of masked multi-scale features or by performing one or more of various other mathematical operations on the features.

As further shown in FIG. 3, the image segment labeling system 106 uses the segment classification neural network 306 to generate segment labels 320 for the image segments of the digital image 302 based on the masked segment embeddings 318. In particular, in some embodiments, the image segment labeling system 106 uses the segment classification neural network 306 (e.g., one or more output layers of the segment classification neural network 306) to generate a segment label for each image segment based on its corresponding masked segment embedding.

Thus, in one or more embodiments, to generate a segment label for an image segment of the digital image 302, the image segment labeling system 106 provides the mask for the image segment and the digital image 302 to the segment classification neural network 306. The image segment labeling system 106 uses the image encoder 308 of the segment classification neural network 306 to generate the image embedding 310 from the digital image 302. The image segment labeling system 106 further executes a mask-based pooling operation via the one or more mask-based pooling layers 312 of the segment classification neural network 306 to generate a set of masked multi-scale features for the image segment based on the image embedding 310 and the mask for the image segment. Additionally, the image segment labeling system 106 uses the visual embedder 316 of the segment classification neural network 306 to generate a masked segment embedding for the image segment based on the set of masked multi-scale features determined for the image segment. From the masked segment embedding, the image segment labeling system 106 uses the segment classification neural network 306 (e.g., one or more output layers) to generate a segment label for the image segment.

In one or more embodiments, the image segment labeling system 106 uses the segment classification neural network 306 to generate segment labels for all image segments of a digital image simultaneously. In some instances, however, the image segment labeling system 106 uses the segment classification neural network 306 to generate the segment labels one by one.

Additionally, in one or more embodiments, the image segment labeling system 106 uses the segment classification neural network 306 to generate segment labels from a closed-vocabulary label set. In some cases, a closed-vocabulary label set includes a set of segment labels for which the segment classification neural network 306 was explicitly trained. For instance, in some embodiments, a closed-vocabulary label set includes a set of segment labels that were included in the training data and used during the training process. In some implementations, however, the image segment labeling system 106 uses the segment classification neural network 306 to generate segment labels from an open-vocabulary label set. In some implementations, an open-vocabulary label set includes a set of segment labels for which the segment classification neural network 306 was not explicitly trained. For instance, in one or more embodiments, an open-vocabulary label set includes a set of segment labels that were not used during the training process. In some cases, an open-vocabulary label set does include segment labels that were used during the training process but also includes additional segment labels that were not used. Thus, in some instances, an open-vocabulary label set includes segment labels that are new to the segment classification neural network 306.

By applying the masks of image segments to the image embedding of the corresponding digital image, rather than to the digital image itself, the image segment labeling system 106 generates more accurate segment labels for the image segments compared to conventional systems. Indeed, as mentioned, by applying the masks to the image embedding, the image segment labeling system 106 considers the context surrounding an image segment within the digital image. Thus, the image segment labeling system 106 more accurately determines the classification for the image segment.

Though FIG. 3 illustrates using masks that correspond to digital images to generate segment labels for various image segments represented by the masks, the image segment labeling system 106 generates segment labels using other representations of image segments in various embodiments. For instance, in some cases, the image segment labeling system 106 uses bounding boxes or point locations that correspond to various image segments of a digital image. Indeed, in some embodiments, the image segment labeling system 106 provides a set of bounding boxes or point locations along with the corresponding digital image as input to the segment classification neural network 306. Accordingly, the image segment labeling system 106 uses the segment classification neural network 306 to generate segment labels based on the bounding boxes or point locations. As will be discussed in more detail below, in some cases, the image segment labeling system 106 uses bounding boxes and/or point locations as part of the training process.

Figure 4:
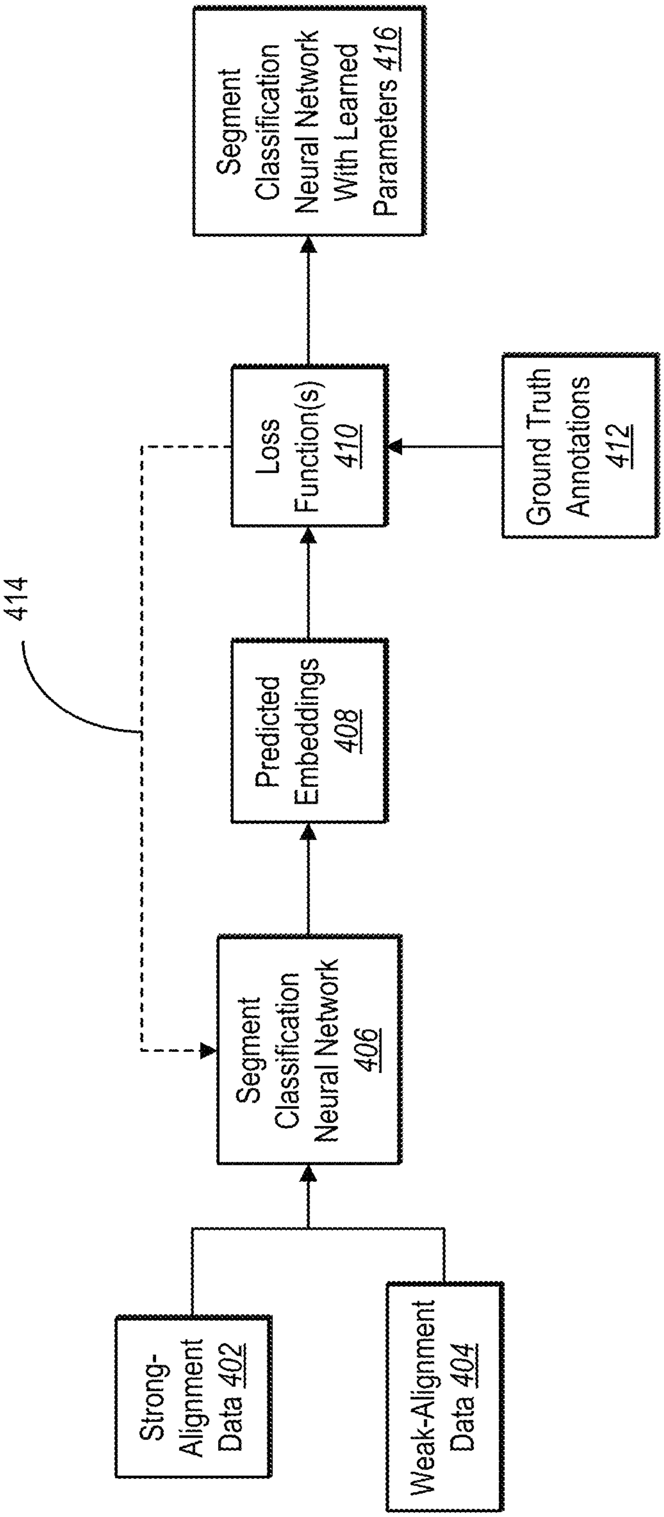
FIG. 4 illustrates the image segment labeling system determining parameters for a segment classification neural network in accordance with one or more embodiments.

As mentioned above, in one or more embodiments, the image segment labeling system 106 trains a segment classification neural network to generate segment labels for image segments of a digital image. In particular, the image segment labeling system 106 determines model that facilitate the generation of accurate segment labels. FIG. 4 illustrates the image segment labeling system 106 determining parameters for a segment classification neural network in accordance with one or more embodiments.

As shown in FIG. 4, trains a segment classification neural network 406 using strong-alignment data 402 and weak-alignment data 404. In one or more embodiments, the designation of data as strong-alignment data or weak-alignment data is arbitrary and relative to other data. For instance, in some cases, strong-alignment data includes training data that correlates relatively strongly with the task for which a neural network is trained, while weak-alignment data includes training data that correlates relatively weakly with the task. To illustrate, in some cases, the strong-alignment data 402 includes training data that correlates relatively strongly with the task of generating segment labels for image segments of a digital image while the weak-alignment data 404 includes training data that correlates relatively weakly with the task.

For instance, in some cases, the image segment labeling system 106 obtains the strong-alignment data 402 from object detection and image segmentation datasets. Accordingly, in some instances, the strong-alignment data 402 includes training images and training segment labels. By contrast, in some implementations, the image segment labeling system 106 obtains the weak-alignment data 404 from image-text pair datasets. As such, in one or more embodiments, the weak-alignment data 404 includes training images and training image captions.

In one or more embodiments, the strong-alignment data 402 and/or the weak-alignment data 404 further include masks for the image segments of the included training images. In some embodiments, the image segment labeling system 106 generates the masks for the training images using a segmentation neural network. Further, in some cases, the strong-alignment data 402 and/or the weak-alignment data 404 include other image segment indicators, such as bounding boxes and/or point locations for the image segments of the included training images.

In one or more embodiments, the image segment labeling system 106 uses the strong-alignment data 402 to determine parameters that facilitate generating segment labels from a closed-vocabulary label set. Additionally, in some cases, the image segment labeling system 106 uses the weak-alignment data 404 to determine parameters that facilitate generating segment labels from an open-vocabulary label set.

As shown in FIG. 4, the image segment labeling system 106 uses the segment classification neural network 406 to generate predicted embeddings 408 from the strong-alignment data 402 and/or the weak-alignment data 404. For instance, in some cases, the image segment labeling system 106 uses the segment classification neural network 406 to generate a set of predicted embeddings based on a training image from the strong-alignment data 402 or the weak-alignment data 404 and the corresponding masks (or bounding boxes or point location). Though not shown in FIG. 4, in some implementations, the image segment labeling system 106 further uses the segment classification neural network 406 to generate predicted segment labels based on the predicted embeddings 408.

As further shown, the image segment labeling system 106 uses one or more loss functions 410 to compare the predicted embeddings 408 (or predicted segment labels) to ground truth annotations 412 (which are included in the strong-alignment data 402 or the weak-alignment data 404) and determine a loss. The image segment labeling system 106 back propagates the determined loss (as represented by the dashed line 414) to update the parameters of the segment classification neural network 406. After updating the parameters through several training iterations, the image segment labeling system 106 obtains a segment classification neural network with learned parameters 416.

As suggested, in one or more embodiments, the image segment labeling system 106 uses both the strong-alignment data 402 and the weak-alignment data 404 to learn parameters for the segment classification neural network 406. Indeed, in some embodiments, the image segment labeling system 106 incorporates the strong-alignment data 402 via a plurality of training iterations and incorporates the weak-alignment data 404 via a plurality of additional training iterations. In some implementations, the image segment labeling system 106 switches between the training data that is used with every training iteration. To illustrate, the image segment labeling system 106 uses the strong-alignment data 402 for a first training iteration, uses the weak-alignment data 404 for a second training iteration, and so forth. In some cases, the image segment labeling system 106 switches between the training data more infrequently, such as by switching between the training data with every training epoch.

By using both strong-alignment data and weak-alignment data to determine parameters for a segment classification neural network, the image segment labeling system 106 trains the segment classification neural network to perform more accurately when generating segment labels when compared to conventional systems. For instance, the image segment labeling system 106 trains the segment classification neural network to accurately determine segment labels for those image segments that fall under those categories represented within the training data but to also determine segment labels for those image segments that do not fall under those categories. Thus, the image segment labeling system 106 trains the segment classification neural network to accurately determine segment labels for a variety of image segments.

Figure 5A:
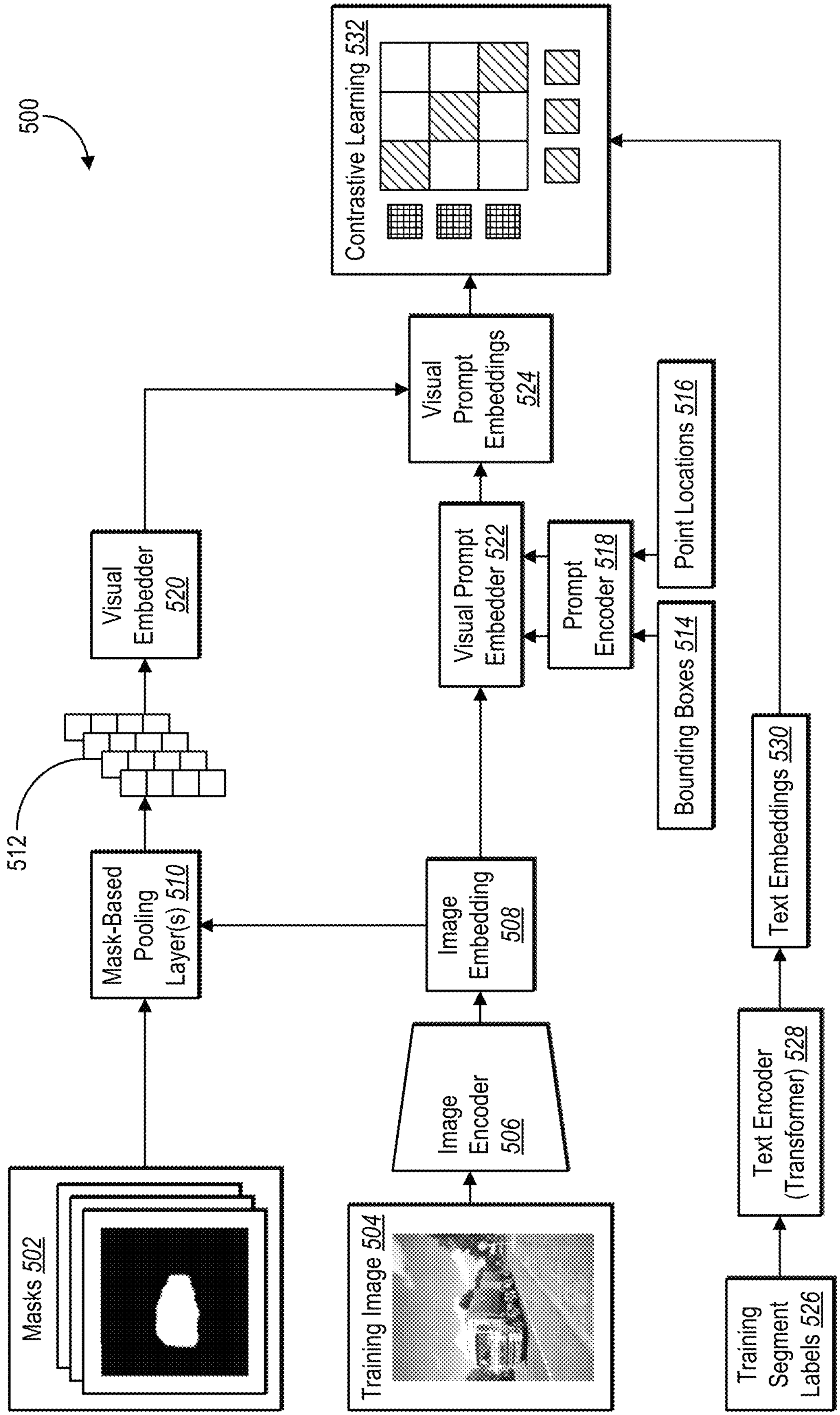
FIG. 5A illustrates determining model parameters for a segment classification neural network using strong-alignment data in accordance with one or more embodiments.
Figure 5B:
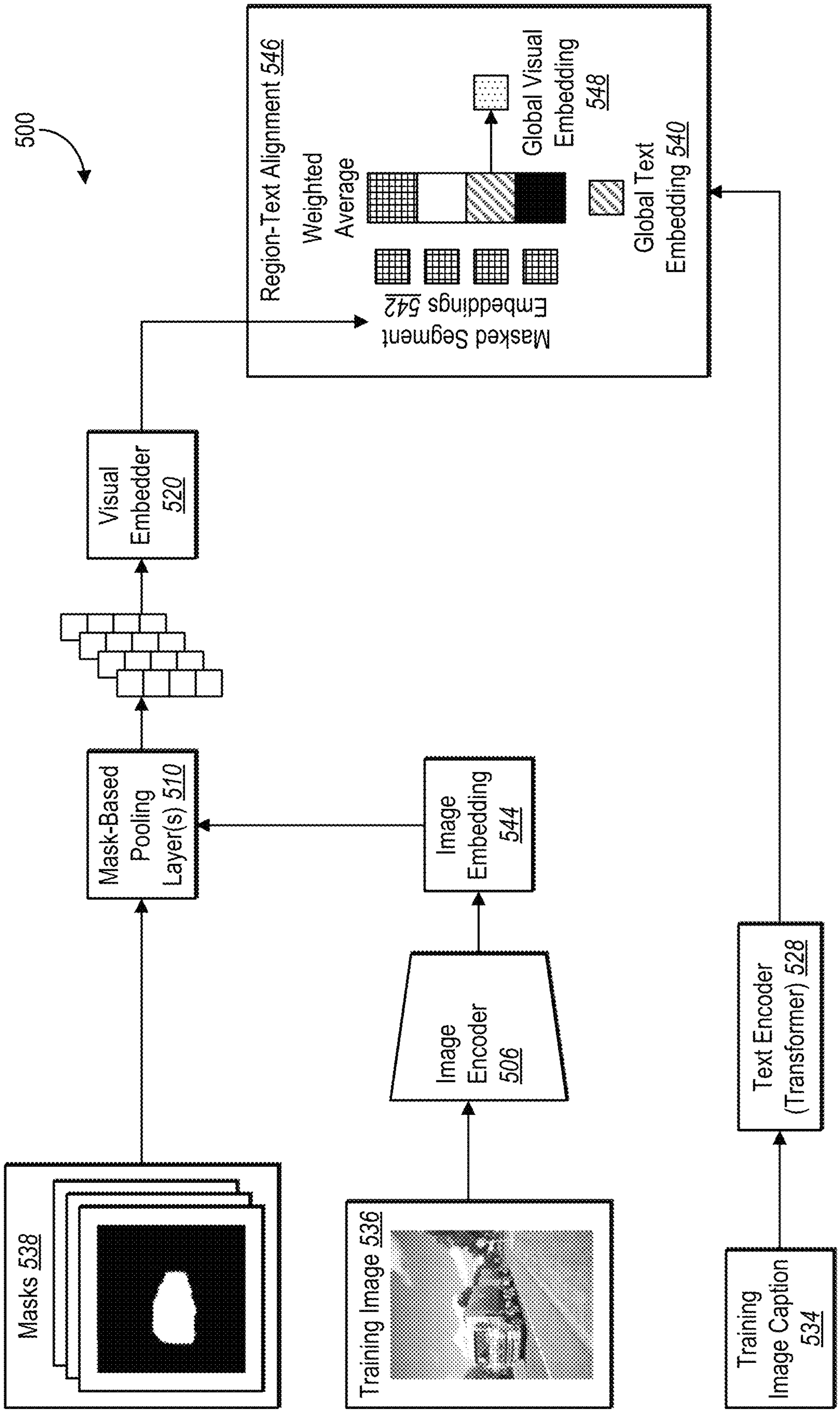
FIGS. 5B-5C illustrate determining model parameters for a segment classification neural network using weak-alignment data in accordance with one or more embodiments.
Figure 5C:
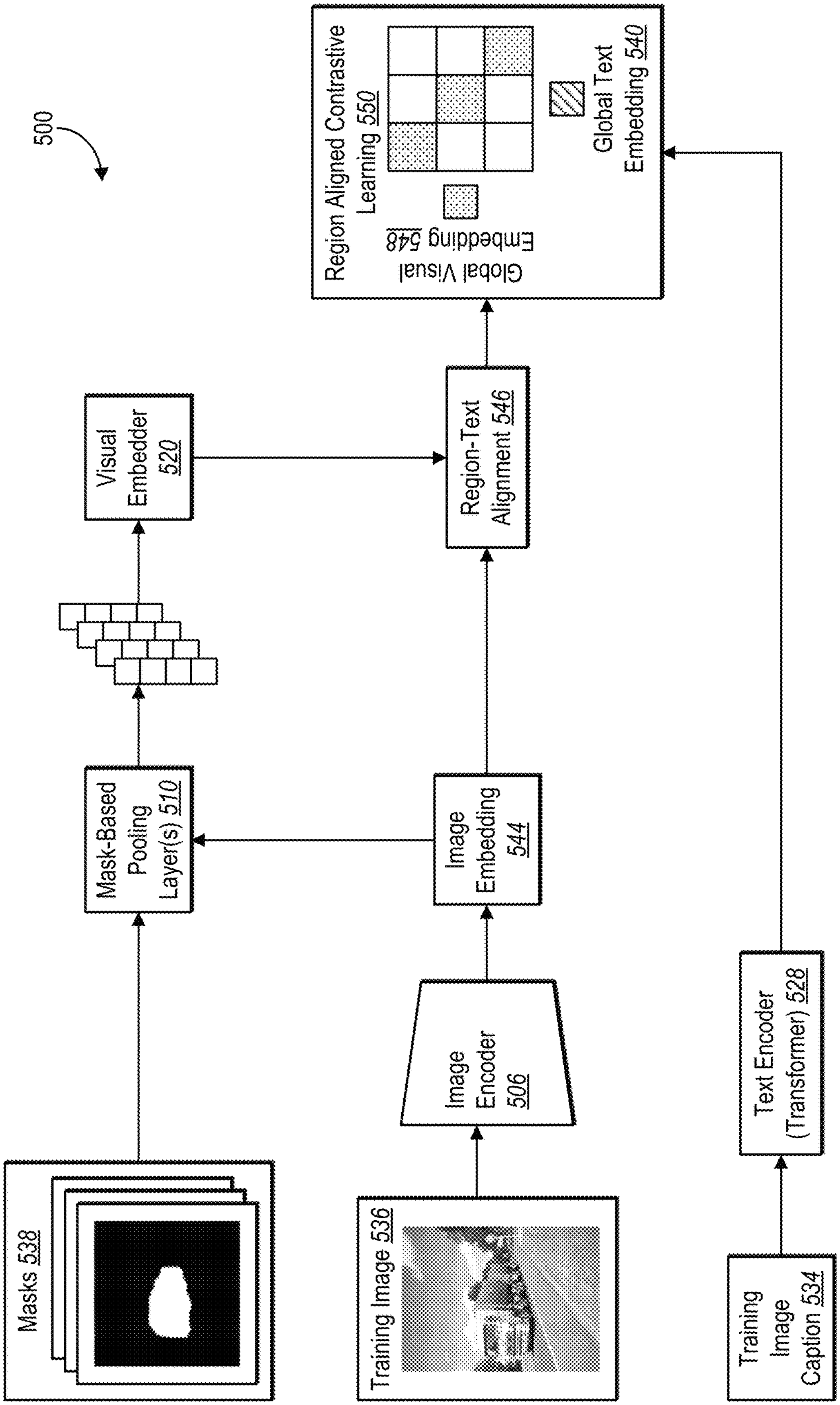

FIGS. 5A-5C illustrate the image segment labeling system 106 determining parameters for a segment classification neural network in accordance with one or more embodiments. In particular, FIG. 5A illustrates determining model parameters using strong-alignment data, and FIGS. 5B-5C illustrate determining model parameters using weak-alignment data in accordance with various embodiments.

As shown in FIG. 5A, the image segment labeling system 106 determines parameters for a segment classification neural network 500 using a training image 504 and masks 502 corresponding to the training image 504 (e.g., corresponding to image segments of the training image 504). As previously mentioned, the masks are included in the strong-alignment data or generated using a separate segmentation neural network in various implementations.

As shown and as described above, the image segment labeling system 106 uses an image encoder 506 of the segment classification neural network 500 to generate an image embedding 508 from the training image 504. The image segment labeling system 106 further provides the image embedding 508 to one or more mask-based pooling layers 510 of the segment classification neural network 500 and uses the one or more mask-based pooling layers 510 to generate masked multi-scale features 512 based on the image embedding 508 and the masks 502.

As further shown in FIG. 5A, in one or more embodiments, the image segment labeling system 106 uses bounding boxes 514 and/or point locations 516 corresponding to the training image 504 (e.g., corresponding to the image segments of the training image 504). Indeed, in some embodiments, the image segment labeling system 106 uses the bounding boxes 514 and/or the point locations 516 as an alternative to the masks 502. In some implementations, the image segment labeling system 106 uses the masks, bounding boxes, and point locations for training the segment classification neural network 500. For instance, in some embodiments, the image segment labeling system 106 uses masks for a first set of training images, bounding boxes for a second set of training images, and point locations for a third set of training images. In further embodiments, the image segment labeling system 106 uses masks, bounding boxes, and point locations for the same training images and exposes the segment classification neural network 500 to the same training images multiple times during the training process (e.g., a first time to use the corresponding masks, a second time to use the corresponding bounding boxes, and a third time to use the corresponding point locations).

In some cases, each bounding box encloses an image segment. Similarly, in some instances, each point location points to a particular point (e.g., a center point) of an image segment. As FIG. 5A illustrates, the image segment labeling system 106 uses a prompt encoder 518 to encode the bounding boxes 514 and/or the point locations 516.

As further shown, the image segment labeling system 106 generates visual prompt embeddings 524. For instance, in some cases, the image segment labeling system 106 uses a visual embedder 520 to generate the visual prompt embeddings 524 (e.g., masked segment embeddings) from the masked multi-scale features 512. In some instances, the image segment labeling system 106 uses a visual prompt embedder 522 to generate the visual prompt embeddings 524 from the encodings of the bounding boxes 514 or the point locations 516.

Additionally, as shown in FIG. 5A, the image segment labeling system 106 uses training segment labels 526 as part of the training process. In particular, in some embodiments, the image segment labeling system 106 uses the training segment labels 526 as ground truth annotations. As illustrated, the image segment labeling system 106 uses a text encoder 528 to generate text embeddings 530 from the training segment labels 526. The image segment labeling system 106 uses a transformer neural network as the text encoder in some implementations.

As further shown, the image segment labeling system 106 uses contrastive learning 532 as part of the training process. In particular, in some embodiments, the image segment labeling system 106 uses the contrastive learning 532 to more closely align the visual prompt embeddings 524 with the text embeddings 530 within a corresponding embedding space. For example, in some cases, the image segment labeling system 106 uses the contrastive learning 532 to adjust the parameters of the segment classification neural network 500 based on the distances between the visual prompt embeddings 524 and the text embeddings 530 within the embedding space.

To illustrate, in some implementations, the image segment labeling system 106 determines similarities between the visual prompt embeddings 524 and the text embeddings 530. In particular, the image segment labeling system 106 determines a similarity between each embedding pair that includes a visual prompt embedding and a text embedding. Thus, in some cases, the image segment labeling system 106 adjusts the parameters of the segment classification neural network 500 to increase the similarities between positive embeddings pairs and to decrease the similarities between negative embeddings pairs.

By using masks, bounding boxes, and point locations, the image segment labeling system 106 trains the segment classification neural network 500 to perform more accurately when compared to the models employed by conventional systems. Indeed, while many conventional systems limit their training data to a single type of image segment indicator, such as masks, the image segment labeling system 106 expands its training data. As such, the image segment labeling system 106 more accurately aligns embeddings for image segments to the appropriate segment labels within an embeddings space, leading to more accurate results at inference time.

As mentioned, FIGS. 5B-5C illustrate the image segment labeling system 106 determining model parameters using weak-alignment data in accordance with various embodiments. FIGS. 5B-5C illustrate a process that is similar to that shown in FIG. 5A, with some differences. For instance, as shown in FIGS. 5B-5C, the image segment labeling system 106 uses a training image caption 534 that corresponds to the training image 536. Thus, the image segment labeling system 106 uses the text encoder 528 to generate a global text embedding 540 that represents the training image caption 534 and corresponds to the training image 536 as a whole, rather than a distinct image segment of the training image 536.

In one or more embodiments, the image segment labeling system 106 uses the training image captions initially included in the weak-alignment data to generate additional training image captions for inclusion within the weak-alignment data. To illustrate, in some instances, the image segment labeling system 106 extracts a noun from a training image caption initially included in the weak-alignment data. The image segment labeling system 106 further generates an additional training image caption using the extracted noun. For instance, in some cases, the image segment labeling system 106 generates the additional training image caption using a text template based on the noun (e.g., by inserting the noun into a template caption). Thus, in some implementations, the image segment labeling system 106 generates additional training image captions to increase the amount of training data represented in the weak-alignment data and uses these additional training image captions during the training process.

As further shown in FIGS. 5B-5C, the image segment labeling system 106 includes masks 538 during the training process but omits bounding boxes and point locations, though the image segment labeling system 106 uses such image segment indicators in some instances. Thus, the image segment labeling system 106 generates masked segment embeddings 542 based on the masks 538 and an image embedding 544 for the training image 536.

Additionally, as shown, the image segment labeling system 106 performs a region-text alignment process 546 using the masked segment embeddings 542 and the global text embedding 540. In particular, the image segment labeling system 106 uses the region-text alignment process 546 to generate a global visual embedding 548 for the training image 536. To illustrate, as indicated more particularly in FIG. 5B, in some embodiments, the image segment labeling system 106 determines a similarity between the global text embedding 540 and each of the masked segment embeddings 542 to determine a representation for each masked segment embedding. In some cases, the image segment labeling system 106 further determines a linear combination of these representations to generate the global visual embedding 548 for the training image 536. As indicated, in some cases, as indicated, the linear combination produces a weighted average representation of the training image 536 where the representation determined for each masked segment embedding includes a weighted representation.

As shown in FIG. 5C, the image segment labeling system 106 uses region aligned contrastive learning 550 to more closely align the global visual embedding 548 with the global text embedding 540. In particular, the image segment labeling system 106 uses the region aligned contrastive learning 550 to adjust the parameters of the segment classification neural network 500 based on the distances between the global visual embedding 548 and the global text embedding 540 within the embedding space.

By using pre-generated masks as part of the weak-alignment data, the image segment labeling system 106 trains the segment classification neural network 500 to perform more accurately when compared to the models employed by conventional systems. Indeed, while many conventional systems train their models to align text with image tokens, the image segment labeling system 106 trains the segment classification neural network 500 to align text with masks. Accordingly, the segment classification neural network 500 is more mask-aware compared to other models and better able to generate appropriate segment labels—particularly those from an open-vocabulary label set—at inference time.

Thus, the image segment labeling system 106 generates more accurate segment labels when compared to many conventional systems. By labeling image segments more accurately, the image segment labeling system 106 facilitates the more accurate implementation of many downstream applications. Indeed, the image segment labeling system 106 enables applications that rely on the accuracy of segment labels to perform in accordance with their purposes.

Figure 6:
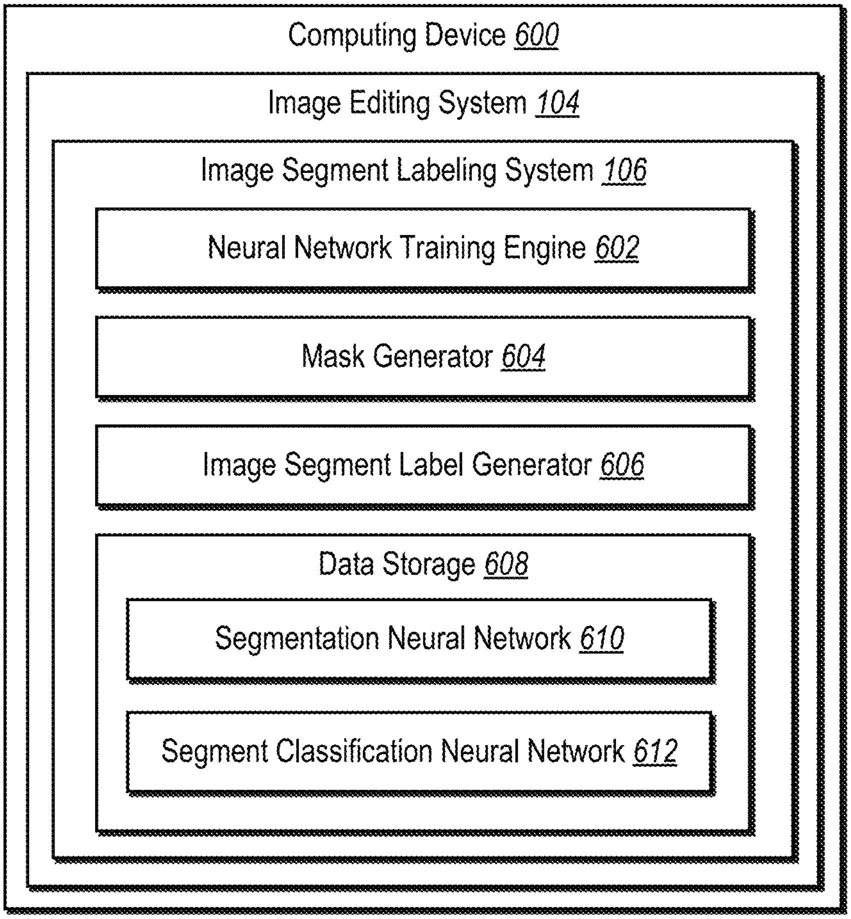
FIG. 6 illustrates an example schematic diagram of an image segment labeling system in accordance with one or more embodiments.

Turning now to FIG. 6, additional detail will now be provided regarding various components and capabilities of the image segment labeling system 106. In particular, FIG. 6 illustrates the image segment labeling system 106 implemented by the computing device 600 (e.g., the server(s) 102 and/or one of the client devices 110*a*-110*n* discussed above with reference to FIG. 1). Additionally, the image segment labeling system 106 is part of the image editing system 104. As shown in FIG. 6, the image segment labeling system 106 includes, but is not limited to, a neural network training engine 602, a mask generator 604, an image segment label generator 606, and data storage 608 (which includes segmentation neural network 610 and segment classification neural network 612).

As just mentioned, and as illustrated in FIG. 6, the image segment labeling system 106 includes the neural network training engine 602. In one or more embodiments, the image segment labeling system 106 trains the various neural networks used to generate segment labels for digital images. For instance, in some cases, the neural network training engine 602 trains a segmentation neural network to generate masks for the image segments portrayed in a digital image. In some embodiments, the neural network training engine 602 further trains a segment classification neural network to generate segment labels for the image segments portrayed in a digital image based on the digital image and masks for the image segments. In some instances, the neural network training engine 602 trains the segment classification neural network using weak-alignment data and strong-alignment data with various image segment indicators.

Additionally, as shown in FIG. 6, the image segment labeling system 106 includes the mask generator 604. In one or more embodiments, the mask generator 604 generates masks for image segments portrayed in a digital image. For instance, in some embodiments, the mask generator 604 implements a segmentation neural network to analyze the digital image and generate the masks accordingly. In some cases, the mask generator 604 generates masks for the image segments regardless of their class.

Further, as shown in FIG. 6, the image segment labeling system 106 includes the image segment label generator 606. In one or more embodiments, the image segment label generator 606 generates segment labels for image segments portrayed in a digital image. For instance, in some implementations, the image segment label generator 606 employs a segment classification neural network to analyze a digital image and pre-generated masks and generate segment labels for the image segments represented by the pre-generated masks. In some cases, the image segment label generator 606 generates the segment labels by applying the masks to an image embedding of the digital image.

As shown in FIG. 6, the image segment labeling system 106 also includes data storage 608. In particular, data storage 608 includes segmentation neural network 610 and segment classification neural network 612. In one or more embodiments, segmentation neural network 610 stores the segmentation neural network trained and employed to generate masks for the image segments portrayed in a digital image. In some embodiments, segment classification neural network 612 stores the segment classification neural network trained and employed to generate segment labels for the image segments of a digital image based on the digital image and masks for the image segments.

Each of the components 602-612 of the image segment labeling system 106 can include software, hardware, or both. For example, the components 602-612 can include one or more instructions stored on a computer-readable storage medium and executable by processors of one or more computing devices, such as a client device or server device. When executed by the one or more processors, the computer-executable instructions of the image segment labeling system 106 can cause the computing device(s) to perform the methods described herein. Alternatively, the components 602-612 can include hardware, such as a special-purpose processing device to perform a certain function or group of functions. Alternatively, the components 602-612 of the image segment labeling system 106 can include a combination of computer-executable instructions and hardware.

Furthermore, the components 602-612 of the image segment labeling system 106 may, for example, be implemented as one or more operating systems, as one or more standalone applications, as one or more modules of an application, as one or more plug-ins, as one or more library functions or functions that may be called by other applications, and/or as a cloud-computing model. Thus, the components 602-612 of the image segment labeling system 106 may be implemented as a stand-alone application, such as a desktop or mobile application. Furthermore, the components 602-612 of the image segment labeling system 106 may be implemented as one or more web-based applications hosted on a remote server. Alternatively, or additionally, the components 602-612 of the image segment labeling system 106 may be implemented in a suite of mobile device applications or "apps." For example, in one or more embodiments, the image segment labeling system 106 can comprise or operate in connection with digital software applications such as ADOBE® PHOTOSHOP® or ADOBE® LIGHTROOM®. The foregoing are either registered trademarks or trademarks of Adobe Inc. in the United States and/or other countries.

Figure 7:
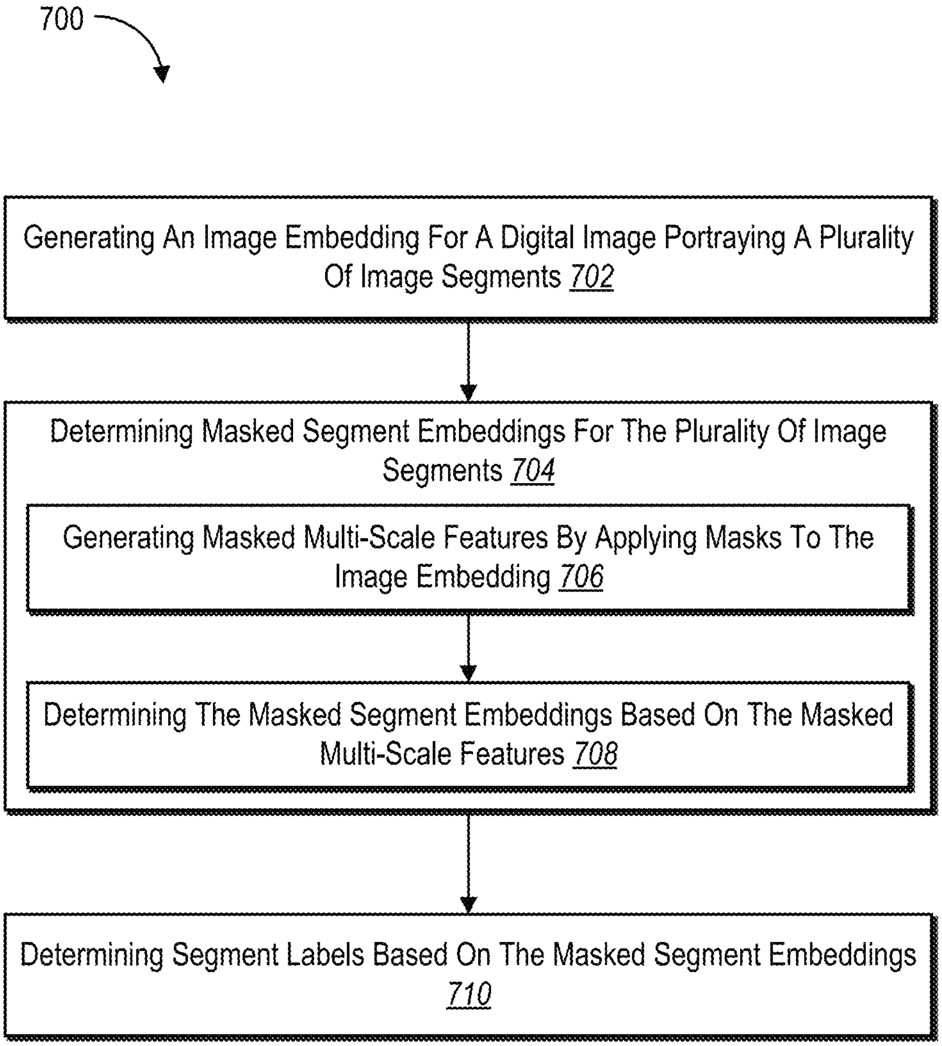
FIG. 7 illustrates a flowchart of a series of acts for generating segment labels for image segments of a digital image in accordance with one or more embodiments.

FIGS. 1-6, the corresponding text, and the examples provide a number of different methods, systems, devices, and non-transitory computer-readable media of the image segment labeling system 106. In addition to the foregoing, one or more embodiments can also be described in terms of flowcharts comprising acts for accomplishing the particular result, as shown in FIG. 7. FIG. 7 may be performed with more or fewer acts. Further, the acts may be performed in different orders. Additionally, the acts described herein may be repeated or performed in parallel with one another or in parallel with different instances of the same or similar acts.

FIG. 7 illustrates a flowchart of a series of acts 700 for generating segment labels for image segments of a digital image in accordance with one or more embodiments. FIG. 7 illustrates acts according to one embodiment, but alternative embodiments may omit, add to, reorder, and/or modify any of the acts shown in FIG. 7. In some implementations, the acts of FIG. 7 are performed as part of a computer-implemented method. Alternatively, a non-transitory computer-readable medium can store executable instructions thereon that, when executed by a processing device, cause the processing device to perform operations comprising the acts of FIG. 7. In some embodiments, a system performs the acts of FIG. 7. For example, in one or more embodiments, a system includes one or more memory devices. The system further includes one or more processors configured to cause the system to perform the acts of FIG. 7.

The series of acts 700 includes an act 702 for generating an image embedding for a digital image portraying a plurality of image segments. For example, in one or more embodiments, the act 702 involves generating, using a segment classification neural network, an image embedding for a digital image portraying a plurality of image segments.

The series of acts 700 also includes an act 704 for determining masked segment embeddings for the plurality of image segments. To illustrate, in some cases, the image segment labeling system 106 determines a masked segment embedding for each image segment portrayed in the digital image.

In one or more embodiments, the act 704 involves determining, using the segment classification neural network, masked segment embeddings for the plurality of image segments of the digital image based on the image embedding and a plurality of masks corresponding to the plurality of image segments. For instance, as shown in FIG. 7, the act 704 includes a sub-act 706 for generating masked multi-scale features by applying masks to the image embedding. Further, as shown, the act 702 also includes a sub-act 708 for determining the masked segment embeddings based on the masked multi-scale features.

In one or more embodiments, the image segment labeling system 106 generates the plurality of masks for the digital image using a segmentation neural network; and provides the plurality of masks with the digital image as input to the segment classification neural network.

In some embodiments, determining the masked segment embeddings for the plurality of image segments of the digital image based on the image embedding and the plurality of masks comprises determining a masked segment embedding for an image segment of the digital image by applying a mask for the image segment to the image embedding to prevent incorporating features represented in the image embedding that are unassociated with the image segment. In some instances, determining the masked segment embeddings for the plurality of image segments of the digital image based on the image embedding and the plurality of masks comprises determining the masked segment embeddings for the plurality of image segments by executing one or more mask-based pooling operations using the image embedding and the plurality of masks. In one or more embodiments, determining the masked segment embeddings for the plurality of image segments by executing the one or more mask-based pooling operations using the image embedding and the plurality of masks comprises: generating a set of masked multi-scale features for an image segment from the plurality of image segments by executing a mask-based pooling operation using the image embedding and a mask corresponding to the image segment; and determining a masked segment embedding for the image segment by combining features from the set of masked multi-scale features. In some implementations, generating the set of masked multi-scale features for the image segment comprises generating the set of masked multi-scale features to include one or more features of an additional image segment from the plurality of image segments.

In some implementations, determining the masked segment embeddings using the segment classification neural network comprises determining the masked segment embeddings using the segment classification neural network having parameters determined using weak-alignment data that includes training images and training image captions, and strong-alignment data that includes additional training images and training segment labels.

Further, the series of acts 700 includes an act 710 for determining segment labels based on the masked segment embeddings. For instance, in some cases, the act 710 involves determining, using the segment classification neural network, segment labels for the plurality of image segments based on the masked segment embeddings. In one or more embodiments, determining the segment labels for the plurality of image segments comprises determining the segment labels from an open-vocabulary label set.

To provide an illustration, in one or more embodiments, the image segment labeling system 106 receives a digital image portraying a plurality of image segments; generates, using a class-agnostic segmentation neural network, a plurality of masks for the digital image by generating a mask for each image segment of the plurality of image segments; and determines segment labels for the plurality of image segments of the digital image by using a segment classification neural network to: generate an image embedding for the digital image; generate a masked segment embedding for each image segment of the digital image based on the image embedding and a corresponding mask from the plurality of masks; and determine a segment label for each image segment of the digital image based on a corresponding masked segment embedding.

In one or more embodiments, the image segment labeling system 106 determines parameters for the segment classification neural network via training iterations that incorporate weak-alignment data having training images and training image captions and additional training iterations that incorporate strong-alignment data having additional training images and training segment labels (and, in some cases, data in the form of bounding boxes and point locations with associated labels). For instance, in some embodiments, the image segment labeling system 106 determines the parameters for the segment classification neural network via the training iterations and the additional training iterations by: providing the training images and masks corresponding to the training images as input to the segment classification neural network during the training iterations; and providing the additional training images and additional masks corresponding to the additional training images as input to the segment classification neural network during the additional training iterations. Further, in some cases, the image segment labeling system 106 determines the parameters for the segment classification neural network by using the training image captions of the weak-alignment data during the training iterations and by using the training segment labels (and, in some cases, the bounding boxes and point locations) of the strong-alignment data during the additional training iterations. In some implementations, the image segment labeling system 106 generates the masks from the training images using a segmentation neural network; and generates the additional masks from the additional training images using the segmentation neural network.

In one or more embodiments, the image segment labeling system 106 determine the parameters for the segment classification neural network via the additional training iterations that incorporate the strong-alignment data by providing the additional training images and bounding boxes or point locations (and, in some cases, masks) corresponding to image segments of the additional training images as input to the segment classification neural network during the additional training iterations. In some embodiments, the image segment labeling system 106 generates the image embedding for the digital image by generating a plurality of multi-scale features from the digital image using an image encoder; and generates the masked segment embedding for each image segment of the digital image based on the image embedding and the corresponding mask by generating, for each image segment, the masked segment embedding based on applying the corresponding mask to the plurality of multi-scale features generated from the digital image. Further, in some instances, the image segment labeling system 106 determines the segment label for each image segment of the digital image by: generating a first segment label for a first image segment corresponding to an object portrayed in the digital image; generating a second segment label for a second image segment corresponding to a background of the digital image; and generating a third segment label for a third image segment corresponding to a foreground of the digital image. In some cases, the image segment labeling system 106 generates segment labels for various components of an object portrayed in a digital image (e.g., a first segment label for the wheel of a car and a second segment label for the body of the car) or generates multiple segment labels for multiple objects portrayed in the digital image or multiple instances of the same object. Further, in some implementations, the image segment labeling system 106 generates segment labels for amorphous regions portrayed within a digital image (e.g., regions between objects). Thus, in some instances, the image segment labeling system 106 generates segment labels for various distinct image segments identified during the segmentation of the digital image.

To provide another illustration, in one or more embodiments, the image segment labeling system 106 generates an image embedding for a digital image using a segment classification neural network having parameters determined based on weak-alignment data that includes training images and training image captions, and strong-alignment data that includes additional training images and training segment labels; determines, using the segment classification neural network, a masked segment embedding for each image segment portrayed within the digital image based on the image embedding and a corresponding mask; and determines, using the segment classification neural network, a segment label for each image segment portrayed within the digital image based on a masked segment embedding determined for the image segment.

In some embodiments, determining the masked segment embedding for each image segment comprises determining, for each image segment, the masked segment embedding having features of the digital image that represent a context surrounding the image segment within the digital image. In some cases, determining the masked segment embedding for each image segment based on the image embedding and the corresponding mask comprises determining the masked segment embedding for each image segment by: generating masked multi-scale features by applying the corresponding mask to the image embedding via a mask-based pooling operation; and determining the masked segment embedding based on the masked multi-scale features.

Additionally, in some cases, determining the masked segment embedding based on the masked multi-scale features comprises determining the masked segment embedding by merging the masked multi-scale features. In certain embodiments, determining the segment label for each image segment comprises determining a plurality of segment labels for a plurality of objects portrayed in the digital image, each object of the plurality of objects corresponding to a mask generated for the digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
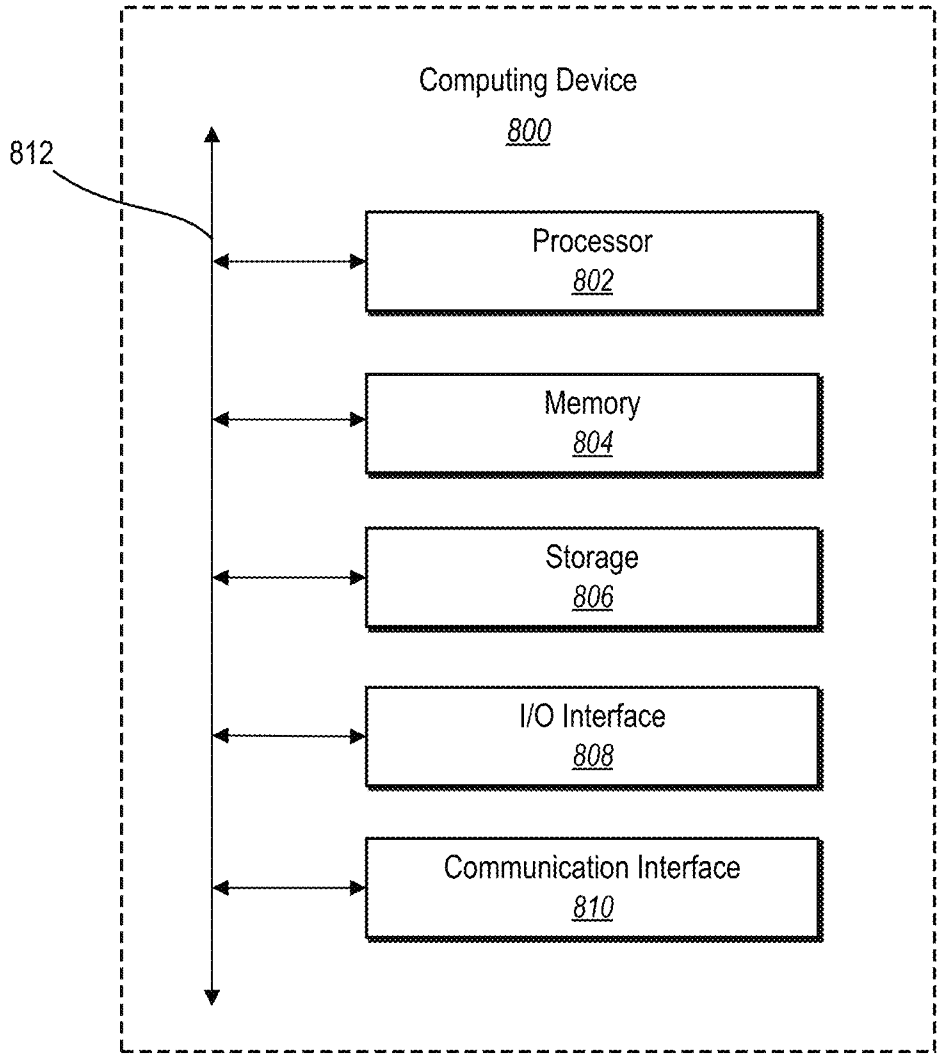
FIG. 8 illustrates a block diagram of an exemplary computing device in accordance with one or more embodiments.

FIG. 8 illustrates a block diagram of an example computing device 800 that may be configured to perform one or more of the processes described above. One will appreciate that one or more computing devices, such as the computing device 800 may represent the computing devices described above (e.g., the server(s) 102 and/or the client devices 110*a*-110*n*). In one or more embodiments, the computing device 800 may be a mobile device (e.g., a mobile telephone, a smartphone, a PDA, a tablet, a laptop, a camera, a tracker, a watch, a wearable device). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 including storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating, using a segment classification neural network, an image embedding for a digital image portraying a plurality of image segments;

determining, using the segment classification neural network, masked segment embeddings for the plurality of image segments of the digital image based on the image embedding and a plurality of masks corresponding to the plurality of image segments by:

generating a set of masked multi-scale features for an image segment from the plurality of image segments by executing a mask-based pooling operation using the image embedding and a mask corresponding to the image segment; and determining a masked segment embedding for the image segment by combining features from the set of masked multi-scale features; and determining, using the segment classification neural network, segment labels for the plurality of image segments based on the masked segment embeddings.

2. The computer-implemented method of claim 1, further comprising:

generating the plurality of masks for the digital image using a segmentation neural network; and providing the plurality of masks with the digital image as input to the segment classification neural network.

3. The computer-implemented method of claim 1, wherein determining the masked segment embeddings for the plurality of image segments of the digital image based on the image embedding and the plurality of masks comprises determining a masked segment embedding for an image segment of the digital image by applying a mask for the image segment to the image embedding to prevent incorporating features represented in the image embedding that are unassociated with the image segment.

4. The computer-implemented method of claim 1, wherein executing the mask-based pooling operations comprises executing one or more mask-based pooling operations via one or more mask-based pooling layers of the segment classification neural network.

5. The computer-implemented method of claim 1, wherein combining the features from the set of masked multi-scale features comprises averaging the features from the set of masked multi-scale features.

6. The computer-implemented method of claim 5, wherein generating the set of masked multi-scale features for the image segment comprises generating the set of masked multi-scale features to include one or more features of an additional image segment from the plurality of image segments.

7. The computer-implemented method of claim 1, wherein determining the segment labels for the plurality of image segments comprises determining the segment labels from an open-vocabulary label set.

8. The computer-implemented method of claim 1, wherein determining the masked segment embeddings using the segment classification neural network comprises determining the masked segment embeddings using the segment classification neural network having parameters determined using weak-alignment data that includes training images and training image captions, and strong-alignment data that includes additional training images and training segment labels.

9. A system comprising:

one or more memory devices; and one or more processors configured to cause the system to:

receive a digital image portraying a plurality of image segments;

generate, using a class-agnostic segmentation neural network, a plurality of masks for the digital image by generating a mask for each image segment of the plurality of image segments; and determine segment labels for the plurality of image segments of the digital image by using a segment classification neural network to:

generate an image embedding for the digital image by generating a plurality of multi-scale features from the digital image using an image encoder;

generate a masked segment embedding for each image segment of the digital image based on the image embedding and a corresponding mask from the plurality of masks by applying the corresponding mask to the plurality of multi-scale features generated from the digital image; and determine a segment label for each image segment of the digital image based on a corresponding masked segment embedding.

10. The system of claim 9, wherein the one or more processors are further configured to cause the system to determine parameters for the segment classification neural network via training iterations that incorporate weak-alignment data having training images and training image captions and additional training iterations that incorporate strong-alignment data having additional training images and training segment labels.

11. The system of claim 10, wherein the one or more processors are configured to cause the system to determine the parameters for the segment classification neural network via the training iterations and the additional training iterations by:

providing the training images and masks corresponding to the training images as input to the segment classification neural network during the training iterations; and providing the additional training images and additional masks corresponding to the additional training images as input to the segment classification neural network during the additional training iterations.

12. The system of claim 11, wherein the one or more processors are further configured to cause the system to:

generate the masks from the training images using a segmentation neural network; and generate the additional masks from the additional training images using the segmentation neural network.

13. The system of claim 10, wherein the one or more processors are configured to cause the system to determine the parameters for the segment classification neural network via the additional training iterations that incorporate the strong-alignment data by providing the additional training images and bounding boxes or point locations corresponding to image segments of the additional training images as input to the segment classification neural network during the additional training iterations.

14. The system of claim 9, wherein applying the corresponding mask to the plurality of multi-scale features generated from the digital image comprises executing at least one pooling operation using the plurality of multi-scale features and the corresponding mask.

15. The system of claim 9, wherein the one or more processors are configured to cause the system to determine the segment label for each image segment of the digital image by:

generating a first segment label for a first image segment corresponding to an object portrayed in the digital image;

generating a second segment label for a second image segment corresponding to a background of the digital image; and generating a third segment label for a third image segment corresponding to a foreground of the digital image.

16. A non-transitory computer-readable medium storing executable instructions that, when executed by a processing device, cause the processing device to perform operations comprising:

generating an image embedding for a digital image using a segment classification neural network having parameters determined based on weak-alignment data that includes training images and training image captions, and strong-alignment data that includes additional training images and training segment labels;

determining, using the segment classification neural network, a masked segment embedding for each image segment portrayed within the digital image based on the image embedding and a corresponding mask by:

generating masked multi-scale features by applying the corresponding mask to the image embedding via a mask-based pooling operation; and determining the masked segment embedding based on the masked multi-scale features; and determining, using the segment classification neural network, a segment label for each image segment portrayed within the digital image based on a masked segment embedding determined for the image segment.

17. The non-transitory computer-readable medium of claim 16, wherein determining the masked segment embedding for each image segment comprises determining, for each image segment, the masked segment embedding having features of the digital image that represent a context surrounding the image segment within the digital image.

18. The non-transitory computer-readable medium of claim 16, wherein determining the masked segment embedding based on the masked multi-scale features comprises determining the masked segment embedding by combining features from the masked multi-scale features.

19. The non-transitory computer-readable medium of claim 18, wherein determining the masked segment embedding based on the masked multi-scale features comprises determining the masked segment embedding by merging the masked multi-scale features.

20. The non-transitory computer-readable medium of claim 16, wherein determining the segment label for each image segment comprises determining a plurality of segment labels for a plurality of objects portrayed in the digital image, each object of the plurality of objects corresponding to a mask generated for the digital image.

* * * * *